April 22, 1941.  N. GUNNUFSON  2,239,227
FISH POLE
Filed May 11, 1940
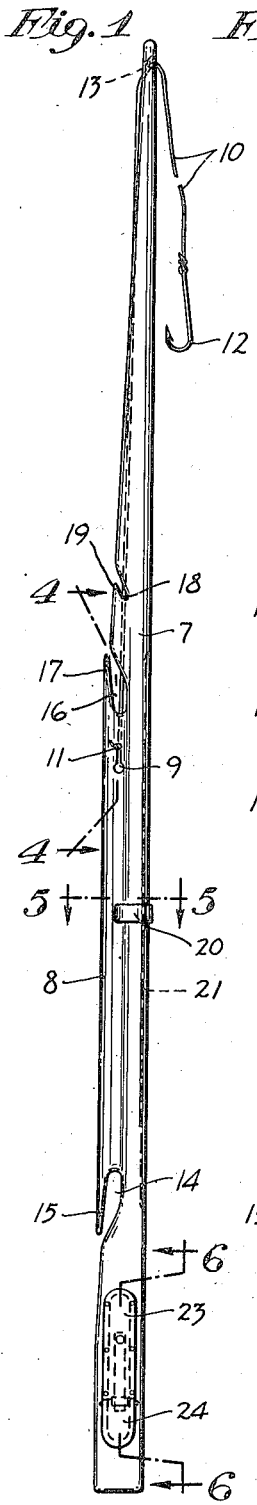
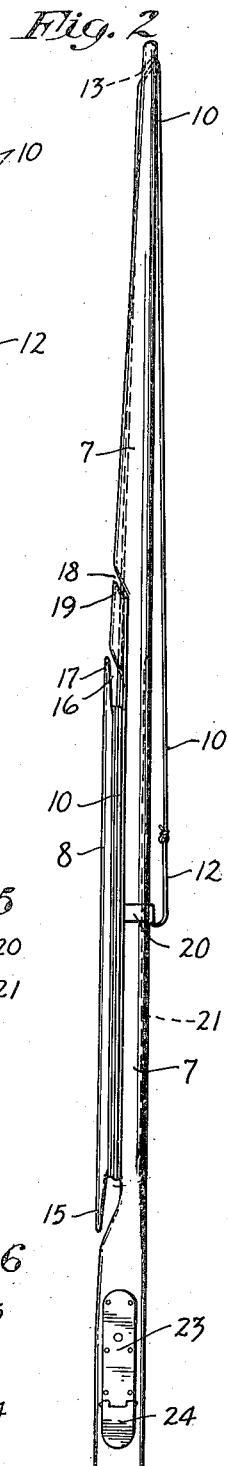
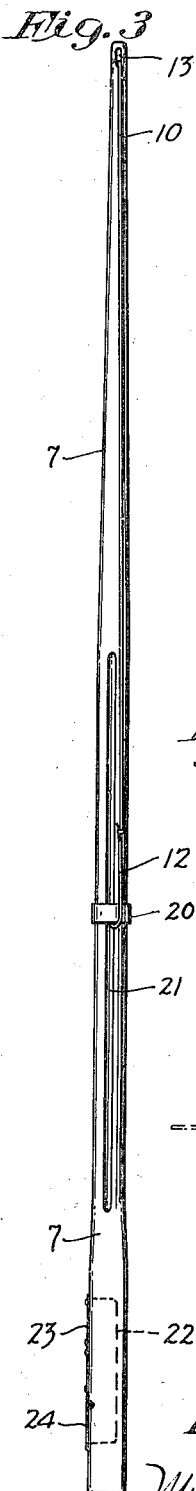
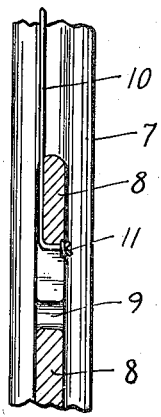
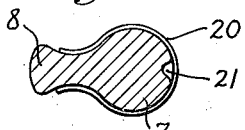
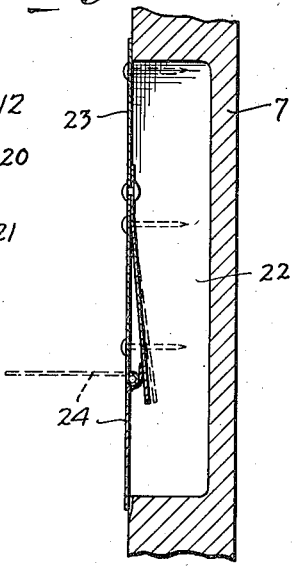
Inventor
Nuffen Gunnufson
By his Attorneys
Merchant & Merchant Patented Apr. 22, 1941

2,239,227

UNITED STATES PATENT OFFICE 2,239,227

FISH POLE

Nuffen Gunnufson, Sunburg, Minn.

Application May 11, 1940, Serial No. 334,560

5 Claims. (Cl. 43—20)

My present invention provides a simple and highly efficient fish pole, and generally stated consists of the novel devices, combinations of devices, and arrangement of parts hereinafter defined in the claims.

The pole, while capable of a wide range of use, has been especially designed, and is particularly adapted for use in deep fishing, such as fishing through the ice or drop line fishing from a boat. The pole is preferably made of wood and has as an important feature a line drying rack or holder, and with devices whereby the wound up or wrapped line and attached fish hook can be safely held in inoperative condition.

The invention is illustrated in the accompanying drawing wherein like characters indicate like parts throughout the several views.

Referring to the drawing:

Fig. 1 is a side elevation of the improved pole and its attachments with the line and hook released for use;

Fig. 2 is a view corresponding to Fig. 1 but showing the line and hook attached to the pole;

Fig. 3 is a view of the pole shown in Fig. 2 looking at the same from the left toward the right in respect to Fig. 2;

Fig. 4 is an enlarged fragmentary section taken on the line 4—4 of Fig. 1;

Fig. 5 is a transverse section taken on the line 5—5 of Fig. 1; and

Fig. 6 is a fragmentary section taken on the line 6—6 of Fig. 1.

The body of the pole is indicated by the numeral 7 and is formed with a lateral projecting longitudinal flange 8 that affords a line-holding rack that extends considerably less than from end to end of the pole. The sides of this flange 8 are concave or channeled so that the outer edge portion of the said flange is wider than that portion that joins the body of the pole. The flange 8 is formed with a key hole shaped slot 9 best shown in Figs. 1 and 4, for attachment of the line to the pole. The fish line is indicated by the numeral 10, and one end is provided with a knot 11, and at its other end with a fish hook 12. The line is anchored by passing its knot through the enlarged end of the hole or slot 9 and drawing the line into the contracted portion of said hole. The line 10 is passed through an eye 13 in the outer end of the pole.

Quite close to the butt end of the pole the flange 8 is formed with under-cut notch 14 that affords a finger portion 15 that projects toward the butt of the pole.

Outward of the anchoring hole 9 the flange 8 has an under-cut notch 16 that affords a finger 17 that projects toward the outer end or tip of the pole. Also further outward or toward the tip of the pole the flange 8 is under-cut at 18 to afford a finger or projection 19 that projects toward the tip of the pole. A substantially U shaped spring metal clip 20 embraces the pole and the concave sides of the flange 8 and quite closely fits the same. This clip 20 is mounted to slide on the pole and to frictionally hold wherever it is set. To permit the fish hook to be engaged with the bowed or outer portion of this clip 20, the pole is formed with a longitudinal groove 21. Figs. 2 and 3 clearly illustrate the manner in which the fish hook can be anchored to the clip 20 with its point in the groove 21 held so that it cannot be engaged by the hand of the person handling the pole.

The manner in which the line will be unwrapped and the pole will be used is of course obvious. When the pole is out of use the line will be wound upon the flange 8 and the hook anchored and fastened as stated, and is illustrated in Figs. 2 and 3. The fish lines will, of course, vary, and it is desired that the whole line be wound up and the hook attached to the clip 20. The sliding movement of the clip affords some, but limited means for compensating for lines of varying length, after the winding on the flange has been completed.

In practice I have found that with but two of the hook-like projections for the wrapping of the line there would sometimes be slack in the line that could not be taken up simply by adjustments of the clip 20; and hence I provide the second or additional line receiving slot and finger portions 18—19. This notch 18 is very much closer to the notch 16 than the said notch 16 is to the notch 14. By wrapping the line in the notches 14 and 16 or in the notches 14 and 18, any line can be taken up to such an extent that the tightening of the line can be completed simply by sliding movements of the hook anchoring clip 20.

Preferably the shank or handle end of the pole is recessed to form a box or receptacle 22 for hooks, sinkers and the like, and this box is covered by a thin metal plate 23 secured to the pole and provided with a spring held door 24. In actual practice, this improved pole has been found to be very desirable and highly efficient for the purpose had in view.

What I claim is:

1. A fish pole provided with a longitudinal flange formed with longitudinally spaced reverse under-cut line winding notches, said pole having a line guide at its tip end, and a fish hook anchoring clip frictionally engaging and sliding on the body of the pole, said flange further having a line anchoring hole located between its reversely under-cut notches.

2. A fish pole provided with a longitudinal flange formed with longitudinally spaced reverse under-cut line winding notches, said pole having a line guide at its tip end, and a fish hook anchoring clip frictionally engaging and sliding on the body of the pole, said flange further having a third under-cut notch that is located nearer the tip of the pole than either of the first noted under-cut notches.

3. A fish pole provided with a longitudinal flange formed with longitudinally spaced reverse under-cut line winding notches, said pole having a line guide at its tip end, and a fish hook anchoring clip frictionally engaging and sliding on the body of the pole, said flange further having a third under-cut notch that is located nearer the tip of the pole than either of the first noted under-cut notches, said flange further having a line anchoring hole located between its first noted under-cut notches.

4. A fish pole provided with a longitudinal flange formed with longitudinally spaced reverse under-cut line winding notches, said pole having a line guide at its tip end, and a fish hook anchoring clip frictionally engaging and sliding on the body of the pole, and which pole is provided with a longitudinal groove with which the point of the fish hook will enter when engaged with the said anchoring clip.

5. A fish pole provided with a longitudinal flange formed with longitudinally spaced reverse under-cut line winding notches, said pole having a line guide at its tip end, and a fish hook anchoring clip frictionally engaging and sliding on the body of the pole, and which hook anchoring clip is an approximately U-shaped spring metal element embracing the body and a portion of the said flange, said pole having a longitudinal groove crossed by said clip, and which will accommodate the point of a fish hook engaged with and anchored by said clip.

NUFFEN GUNNUFSON.